United States Patent
Farooqui et al.

(10) Patent No.: US 10,162,632 B1
(45) Date of Patent: Dec. 25, 2018

(54) SYSTEM AND METHOD FOR A LOW-POWER PROCESSING ARCHITECTURE

(71) Applicant: Cadence Design Systems, Inc., San Jose, CA (US)

(72) Inventors: Aamir A. Farooqui, Elk Grove, CA (US); David Lawrence Heine, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 102 days.

(21) Appl. No.: 15/166,489

(22) Filed: May 27, 2016

(51) Int. Cl.
*G06F 7/38* (2006.01)
*G06F 9/30* (2018.01)
*G06F 9/38* (2018.01)

(52) U.S. Cl.
CPC .......... *G06F 9/3001* (2013.01); *G06F 9/3867* (2013.01); *G06F 9/3887* (2013.01)

(58) Field of Classification Search
CPC ..... G06F 9/3001; G06F 9/3867; G06F 9/3887
See application file for complete search history.

(56) References Cited

U.S. PATENT DOCUMENTS

| | | | | |
|---|---|---|---|---|
| 6,055,619 | A * | 4/2000 | North | G10H 7/002 704/270 |
| 9,213,523 | B2 * | 12/2015 | Samudrala | G06F 7/483 |
| 2006/0095717 | A1 * | 5/2006 | Glossner | G06F 9/30036 712/24 |
| 2006/0253520 | A1 * | 11/2006 | Tran | G06F 7/5318 708/607 |
| 2007/0185953 | A1 * | 8/2007 | Prokopenko | G06F 7/483 708/523 |
| 2008/0140994 | A1 * | 6/2008 | Khailany | G06F 9/30014 712/205 |
| 2010/0017449 | A1 * | 1/2010 | Meinds | G06T 11/001 708/290 |
| 2014/0281370 | A1 * | 9/2014 | Khan | G06F 9/30036 712/7 |
| 2016/0254866 | A1 * | 9/2016 | Blumenthal | H04B 10/503 398/197 |
| 2017/0139676 | A1 * | 5/2017 | Lutz | G06F 7/02 |

* cited by examiner

*Primary Examiner* — Tan V. Mai
(74) *Attorney, Agent, or Firm* — Mark H. Whittenberger, Esq.; Holland & Knight LLP

(57) ABSTRACT

The present disclosure relates to a system and method for use in a digital signal processing environment. Embodiments may include a programmable processor configured to execute an instruction set that includes multiply instructions and/or multiply-accumulate instructions that generate a result in carry-save format or redundant binary format. The instruction set may be executed at a single instruction, multiple data (SIMD) level.

16 Claims, 7 Drawing Sheets

SYSTEM AND METHOD FOR A LOW-POWER PROCESSING ARCHITECTURE

FIELD OF THE INVENTION

The present disclosure relates to digital signal processing, and more specifically, to a system and method for a low-power processing architecture.

DISCUSSION OF THE RELATED ART

Multiply-accumulate (MAC) instructions are the core of any digital signal processing (DSP) instruction set architecture (ISA). The performance of a DSP engine is often measured in terms of MACs per cycle. These instructions are used in data-intensive applications. Some of these include, but are not limited to, Convolutional Neural Network (CNN), Image/Video Processing, Orthogonal frequency-division multiplexing (OFDM), finite impulse response (FIR), fast-fourier transform (FFT) and/or inverse FFT computations. A typical MAC unit consumes nearly 75-90% of the total energy during MAC bound DSP computations. Low power consumption is the main requirement for battery powered low power wearables and other devices.

SUMMARY

In one or more embodiments of the present disclosure, a digital signal processing system is provided. The system may include at least one programmable processor configured to execute an instruction set that includes at least one of multiply instructions and/or multiply-accumulate instructions that generate a result in carry-save format or redundant binary format. The instruction set may be executed at a single instruction, multiple data (SIMD) level.

One or more of the following features may be included. In some embodiments, the at least one programmable processor may further include at least one register in communication with at least one of a multiplier and a partial product tree. The at least one programmable processor may further include a carry and sum pipeline in communication with at least one of a multiplier and an adder tree. The at least one programmable processor may further include a final adder in communication with the carry and sum pipeline. The carry and sum pipeline may be in communication with at least one of the multiplier and the partial product tree and the carry and sum pipeline may be further configured to generate an output that may be conditionally provided to at least one of the multiplier and the partial product tree. In some embodiments, conditionally providing the output from the carry and sum pipeline to at least one of the multiplier and the partial product tree may include bypassing the final adder. The multiplier may be a booth multiplier. In some embodiments, bypassing the final adder may avoid performing carry propagate addition at an accumulate stage. The at least one programmable processor may be associated with at least one of a convolutional neural network, an image processing application, a video processing application, an orthogonal frequency-division multiplexing (OFDM) application, a finite impulse response (FIR), a fast-fourier transform (FFT) and an inverse FFT. The at least one programmable processor may be a C-programmable processor.

In some embodiments, a digital signal processing method is provided. The method may include providing at least one programmable processor configured to execute an instruction set that includes at least one of multiply instructions and/or multiply-accumulate instructions that generate a result in carry-save format or redundant binary format. The instruction set may be executed at a single instruction, multiple data (SIMD) level.

One or more of the following features may be included. In some embodiments, the at least one programmable processor may further include at least one register in communication with at least one of a multiplier and a partial product tree. The at least one programmable processor may further include a carry and sum pipeline in communication with at least one of a multiplier and an adder tree. The at least one programmable processor may further include a final adder in communication with the carry and sum pipeline. The carry and sum pipeline may be in communication with at least one of the multiplier and the partial product tree and the carry and sum pipeline may be further configured to generate an output that may be conditionally provided to at least one of the multiplier and the partial product tree. In some embodiments, conditionally providing the output from the carry and sum pipeline to at least one of the multiplier and the partial product tree may include bypassing the final adder. The multiplier may be a booth multiplier. In some embodiments, bypassing the final adder may avoid performing carry propagate addition at an accumulate stage. The at least one programmable processor may be associated with at least one of a convolutional neural network, an image processing application, a video processing application, an orthogonal frequency-division multiplexing (OFDM) application, a finite impulse response (FIR), a fast-fourier transform (FFT) and an inverse FFT. The at least one programmable processor may be a C-programmable processor.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
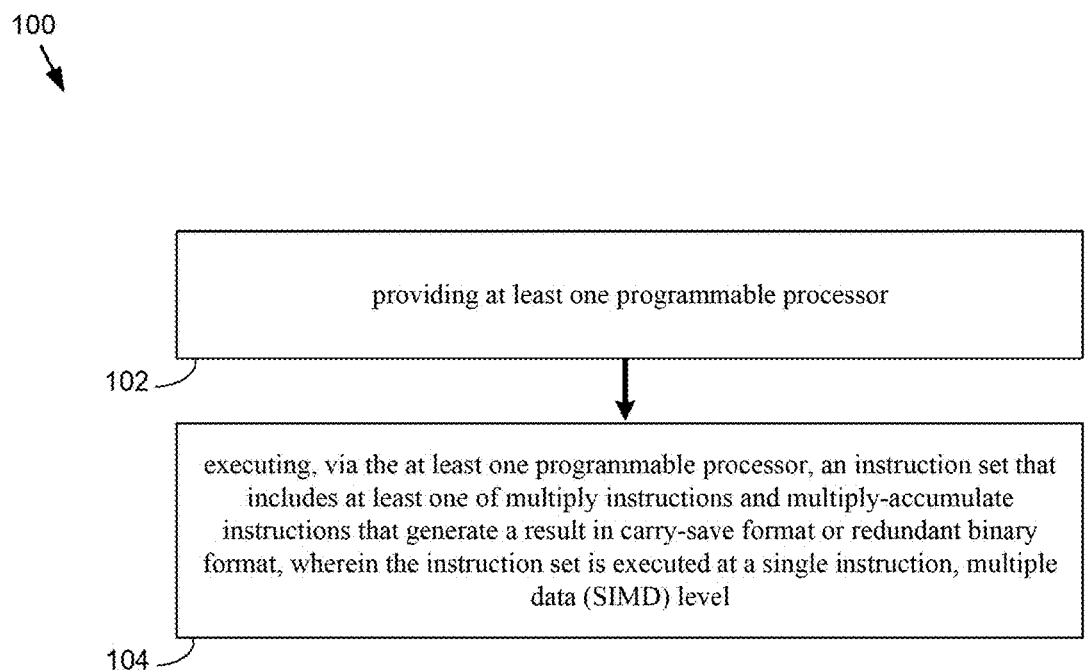
FIG. 1 is a flowchart depicting an embodiment of a method in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, an embodiment of a digital signal processing method consistent with the present disclosure is provided. The method may include providing (102) at least one programmable processor and executing (104), via the at least one programmable processor, an instruction set that includes multiply and/or multiply-accumulate instructions that generate a result in carry-save format and/or redundant binary format. The instruction set may be executed at a single instruction, multiple data (SIMD) level. For example, the phrase "SIMD level" may refer to a situation where the processor may issue one instruction and 8, 16, 32, or 64 multiply operations may be performed in parallel utilizing all of the 8, 16, 32, or 64 multipliers at the same time. Therefore, optimizing MAC power at the SIMD level is important as compared to Single Multiply operation.

The instructions are directed towards a low-power, SIMD, Carry Save MAC, Instruction set that may be used with C-programmable processors. This technique not only removes power consumption by the CPA, input-output registers, and input-output register file but also reduce instruction size, as is discussed in further detail herein below.

Embodiments of the digital signal processing system and methods described in this document may be implemented in hardware, which may include, but is not limited to electrical circuits and/or various types of circuitry. As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Figure 2:
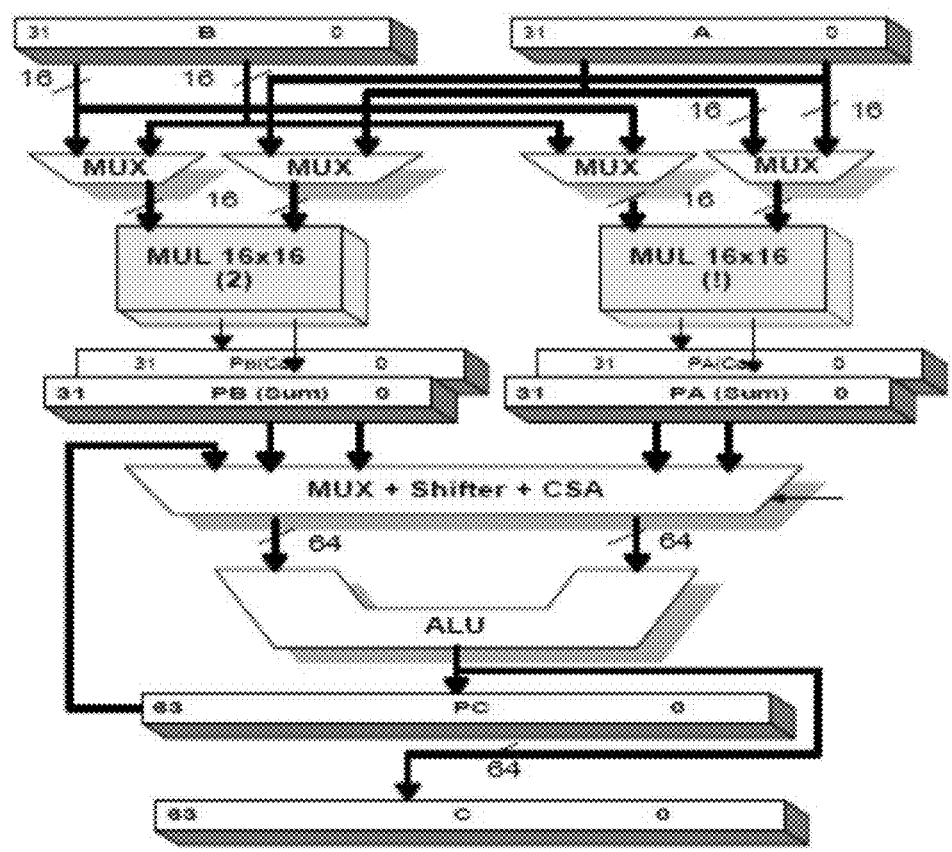
FIG. 2 is a block diagram depicting an embodiment in accordance with the present disclosure.

Referring now to FIG. 2, a basic MAC architecture consists of a multiplier and an accumulate adder. Inputs may be fed to the multiplier, and successive products may be summed by the accumulate adder. In some embodiments, multipliers may be include various components, some of which may include, but is not limited to, a partial-product unit (e.g., the PP unit) and a carry-propagate adder (e.g., the final adder).

Figure 3:
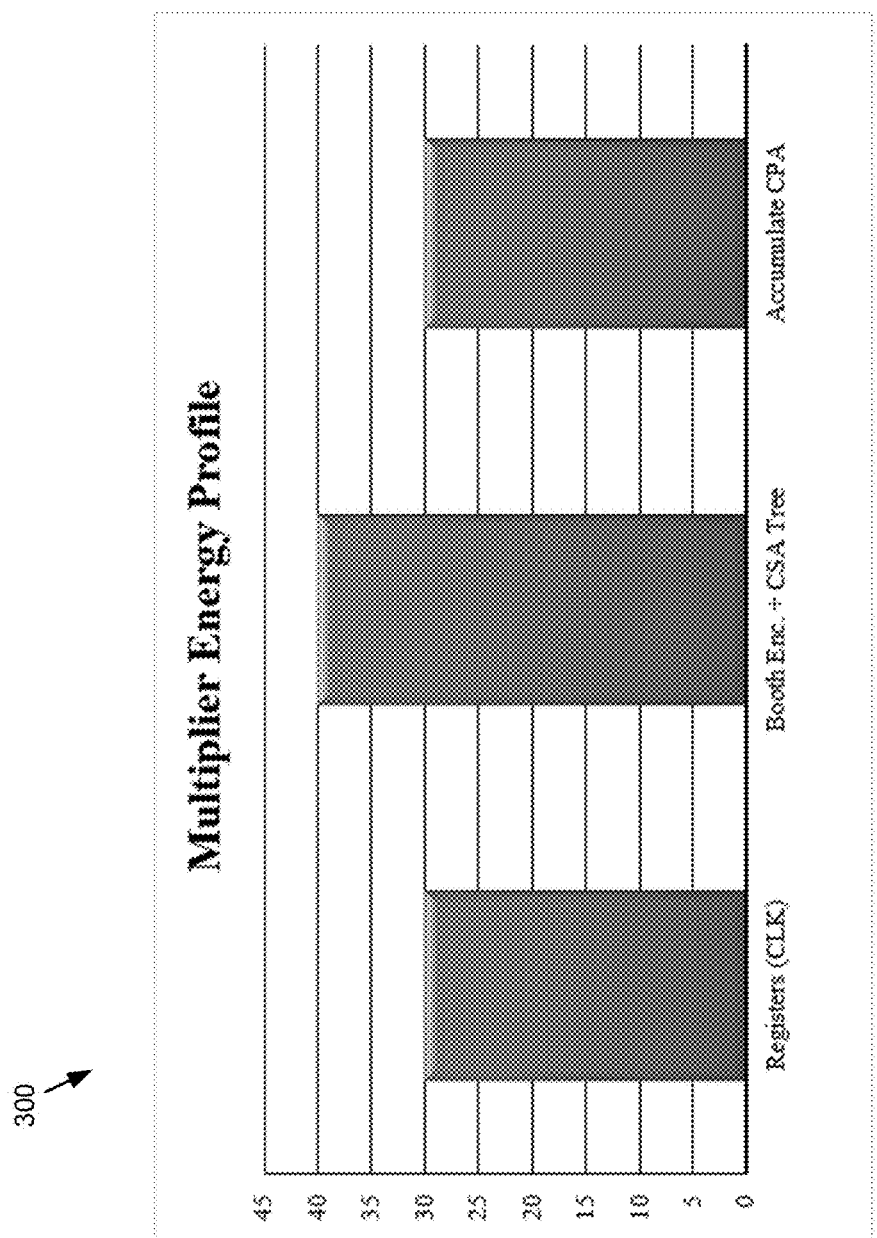
FIG. 3 is a diagram depicting a typical example of an energy profile associated with a multiplier.

Multiply-accumulate (MAC) instructions are the core of any DSP ISA. The performance of a DSP engine are often measured in terms of MACs per cycle. These instructions may be used in data-intensive applications. For example, Convolutional Neural Networks (CNNs), Image/Video Processing, OFDM, FIR or FFT/IFFT computations. A typical MAC unit consumes nearly 75-90% of the total energy during MAC bound DSP computations. Low power consumption is the main requirement for battery powered low power wearables and IOT devices. At the same time it is important to lower the power consumption of high performance, high bitwidth SIMD processors. As is depicted in FIG. 3, inside a MAC unit 30% power is consumed by the registers (CLK), 30-40% by the partial product generation and CSA tree, and the remaining 30% is consumed by the final carry propagate adder in the accumulator. The accumulator power is further increased if wide output adders are used. Wide output adders are common in modern DSPs due to the accumulation of a large number of inputs.

Figure 4:
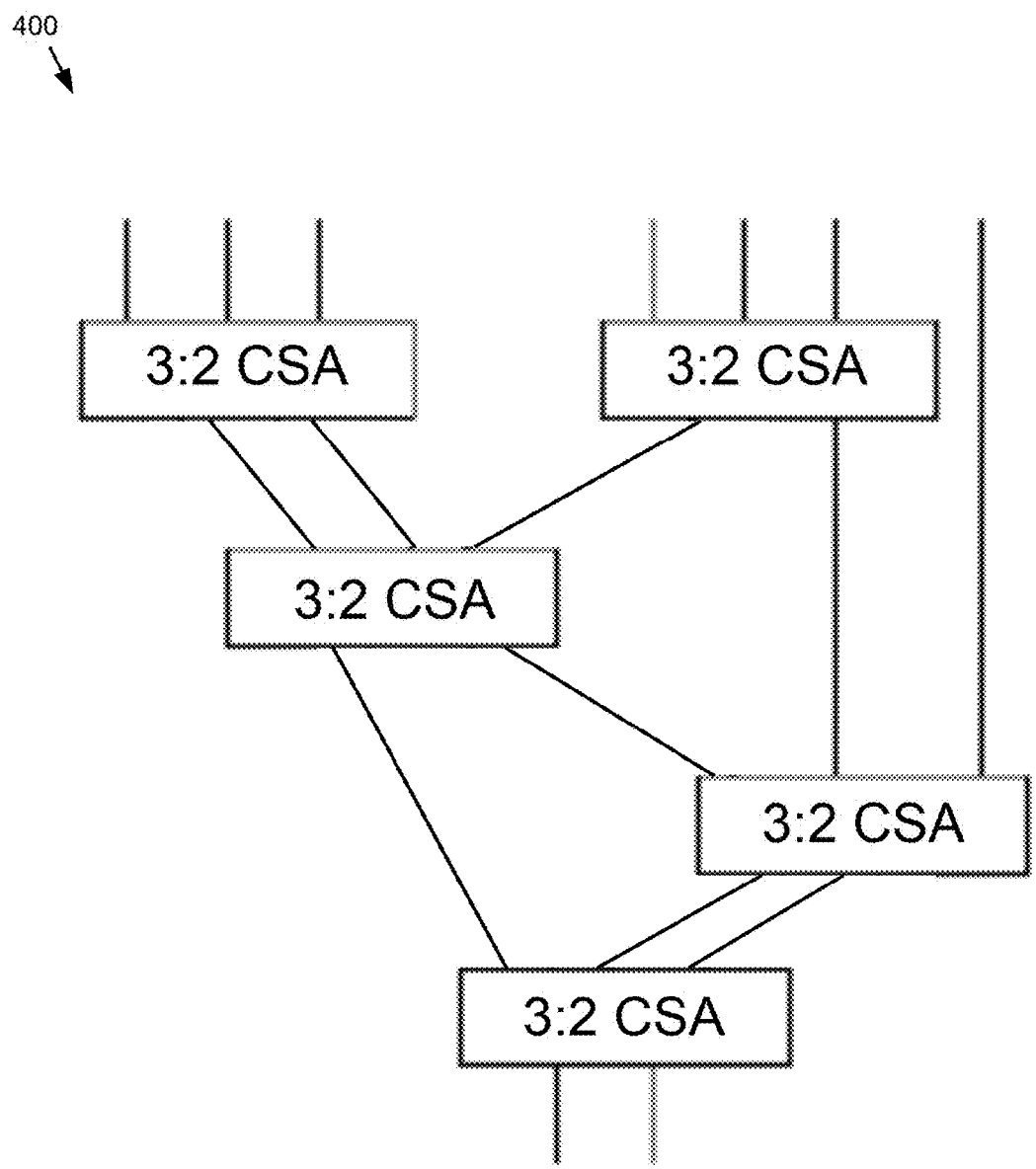
FIG. 4 is a diagram depicting an example of carry-save arithmetic in accordance with an embodiment of the present disclosure.

Accordingly, with the requirement to reduce multiplier power and support MAC intensive functions in image processing and CNN, embodiments of the present disclosure are directed towards a low-power, SIMD, Carry Save, MAC, Instruction set that may be used with C-programmable processors. This technique not only removes power consumption by the CPA, input-output registers, and input-output register file but also reduce instruction size, as is discussed in further detail herein below, Referring now to FIG. 4, an embodiment depicting an example of carry-save arithmetic is provided. Carry-Save Arithmetic is the ability to add numbers without carry propagation in the X-direction. Accordingly, the basic idea is that three numbers may be reduced to 2, in a 3:2 compressor, by performing the addition while maintaining the carries and the sum separate. In this way, all of the columns may be added in parallel without relying on the result of the previous column, creating a two output "adder" with a time delay that is independent of the size of its input widths. Since, there is no carry-propagation from one end to the other, Carry-Save arithmetic produces faster circuits and lower energy. CSA produces results in redundant binary form, therefore, a final adder is required at the end of computation to produce a 2's complement result.

Figure 5:
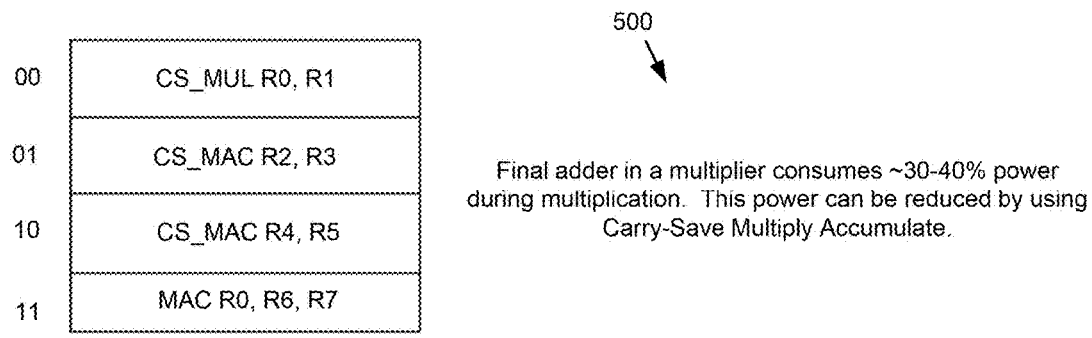
FIG. 5 is a block diagram depicting an embodiment in accordance with the present disclosure.
Figure 5:
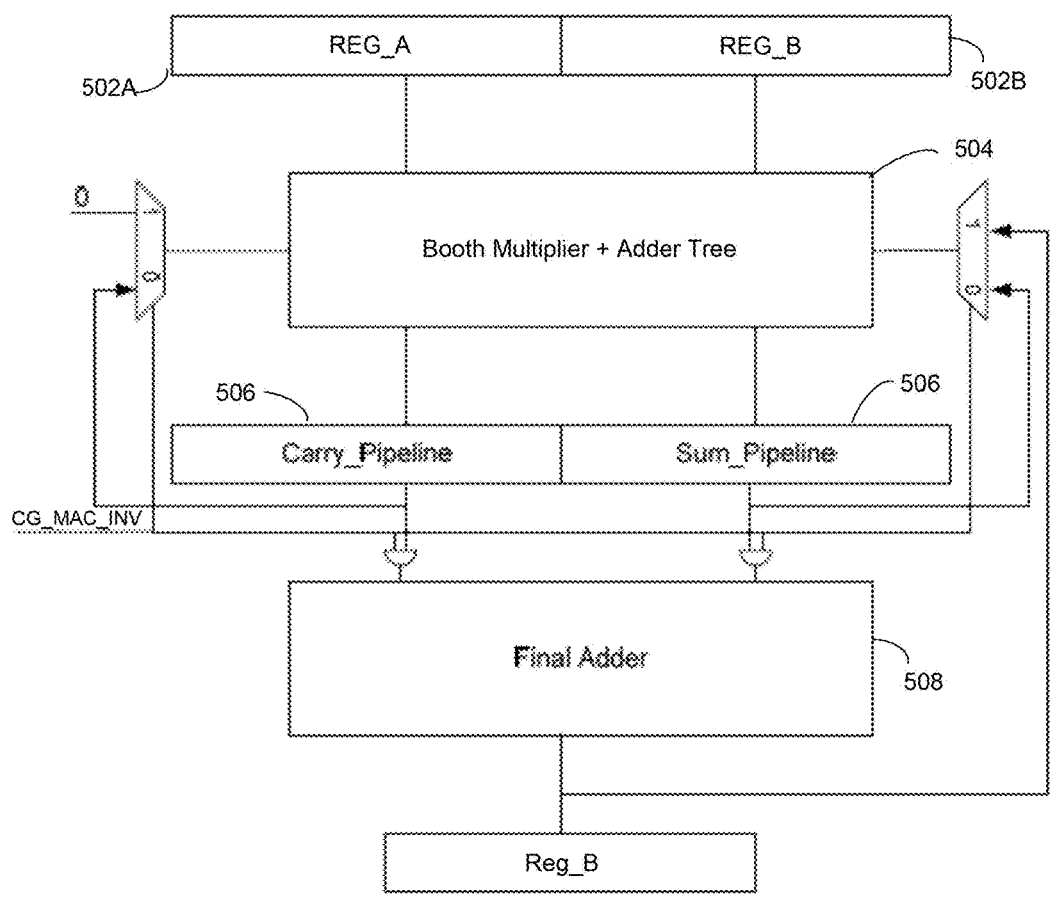

Referring now to FIG. 5, an embodiment of the present disclosure is provided in which there is no carry propagate addition for a set of instructions, which therefore significantly reduces the power consumption. With the requirement to reduce multiplier power and support MAC intensive functions in image processing and CNN, embodiments of the present disclosure are directed towards a SIMD CSA MAC, instruction set.

In this particular embodiment, circuitry 500 is provided that may include various processing components. For example, registers 502A and 502B are shown in communication with multiplier (e.g. a Booth multiplier) and adder tree 504, which may be electrically connected with carry and sum pipeline 506. Final adder 508 is configured to receive an output from carry and sum pipeline 506 and may be disabled to save power as is discussed in further detail below.

Figure 6:
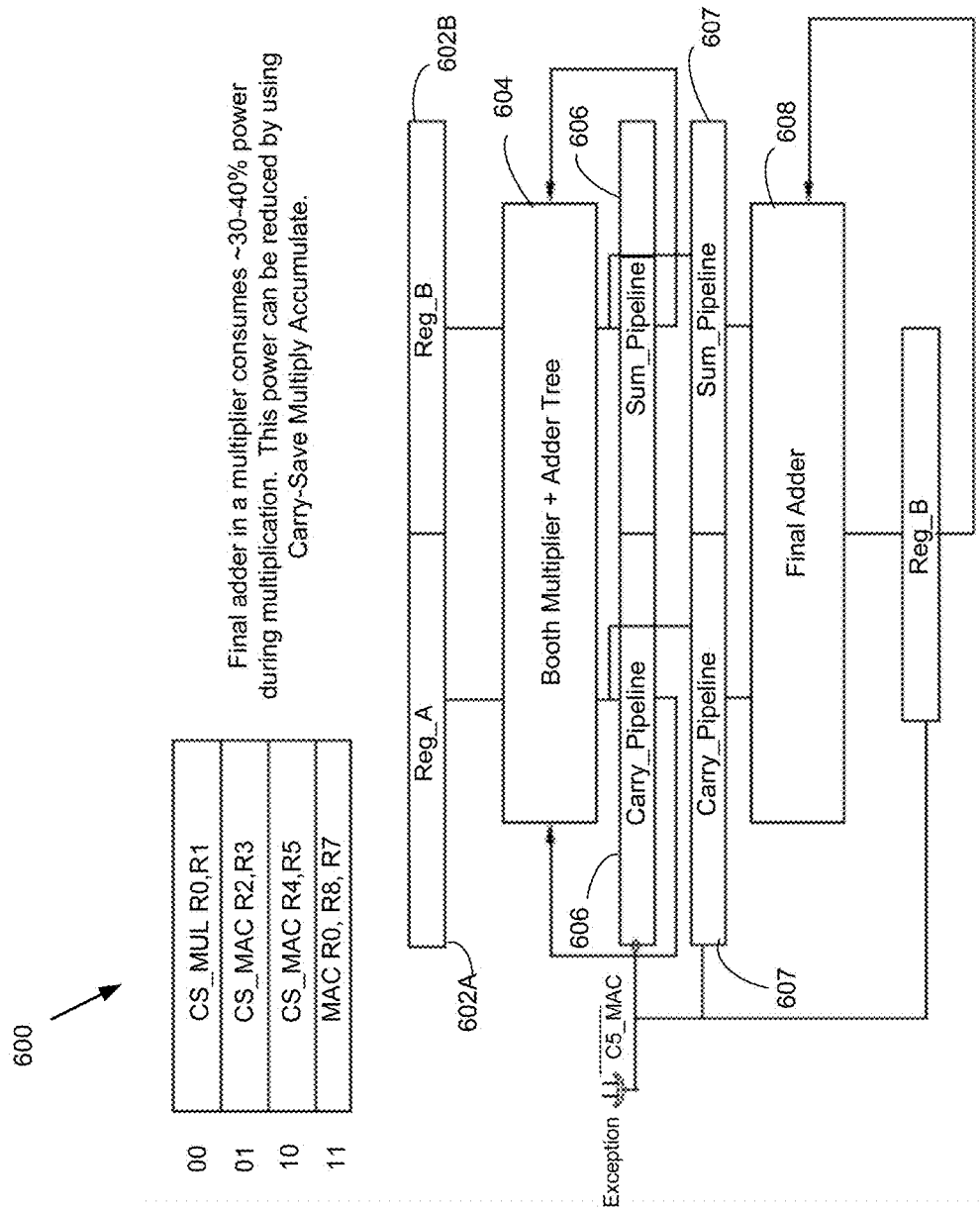
FIG. 6 is a block diagram depicting an embodiment in accordance with the present disclosure.

As shown in FIGS. 5-6, embodiments of the present disclosure may be configured to conditionally bypass Carry and Sum vectors back to the multiplier partial product tree without performing Carry Propagate Addition (CPA) in the accumulate stage. This technique removes power consumption by the CPA, output registers, and output register file (e.g. the final adder may be shut down completely in order to conserve power). This may be particularly advantageous when dealing with extremely large numbers of operations such as those required during a convolutional neural network or other type of extensive processing environment.

Referring now to FIG. 6, another embodiment of the present disclosure is provided in which clock gated pipeline registers 606-607 are used to control the data input for the carry save adder tree and final carry propagate adder, respectively. In some embodiments, only one set of registers (e.g., 606 or 607) may be enabled for carry-save MAC or regular MAC operation. In this particular example, the following minimal set of instructions may be used to enable SIMD CS MAC in accordance with an embodiment of the present disclosure:

CS_MUL R0, R1//Carry Save first multiplication
CS_MAC R2, R3//Carry Save MAC using the CS result of previous CS_MUL
CS_MAC R4, R5//Carry Save MAC using the CS result previous MAC
CS_MSC R6, R7//Carry Save Multiply Subtract using the CS result previous MAC
MAC_R0, R8, R7//Final MAC with 2's complement result Additionally and/or alternatively, since carry-save, MAC instructions perform the same multiplications as regular MAC instructions, very minimal changes are required in the programming sequence for using CS MAC instructions. An example of the differences is provided below by way of example only. The first example (e.g. example A) is the programming sequence for conventional MAC instructions and the second example (e.g., example B) indicates one example showing the changes required to implement the teachings of the present disclosure.

Example A for (d=0;d<D3;d++)//Reference point A
{
    int cnt_1=d*25;
    xb_vecNx16 d0,*optr;
    xb_vec2Nx24 sum 0;
    valign u_data;
    optr=(xb_vecNx16*)(((short*)dptr)+cnt_1);
    u_data=IVP_LANX16_PP(optr);
    IVP_LANX16_IP(d0,u_data,optr);

```
IVP_LV2NX8_IP(c0,cptr,64);
sum_0=IVP_MUL2N8XR16(c0,IVP_EXTRNX16
    (d0,0));
IVP_LV2NX8_IP(c0,cptr,64);
IVP_MULA2N8XR16(sum_0,c0,IVP_EXTRNX16
    (d0,1));
IVP_LV2NX8_IP(c0,cptr,64);
IVP_MULA2N8XR16(sum_0,c0,IVP_EXTRNX16
    (d0,2));
IVP_LV2NX8_IP(c0,cptr,64);
IVP_MULA2N8XR16(sum_0, c0,IVP_EXTRNX16
    (d0,3));
IVP_LV2NX8_IP(c0,cptr,64);
IVP_MULA2N8XR16(sum_0,c0,IVP_EXTRNX16
    (d0,4));
}
```

Example B

```
for (d=0;d<D3;d++) //Reference point A
{
    int cnt_1 = d*25;
    xb_vecNx16 d0,*optr;
    xb_vec2Nx24 sum_0;
    valign u_data;
    optr = (xb_vecNx16 *)(((short *)dptr) + cnt_1);
    u_data = IVP_LANX16_PP(optr);
    IVP_LANX16_IP(d0,u_data,optr);
    IVP_LV2NX8_IP(c0,cptr,64);
    MUL_CS_2N8XR16(c0,IVP_EXTRNX16(d0,0)); // Carry Save
first multiplication no need to specify output
    IVP_LV2NX8_IP(c0,cptr,64);
    MAC_CS_2N8XR16(c0,IVP_EXTRNX16(d0,1)); // Carry Save
MAC using MUL_CS out no need to specify ACC sum_0
    IVP_LV2NX8_IP(c0,cptr,64);
    MAC_CS_2N8XR16(c0,IVP_EXTRNX16(d0,2)); // Carry Save
MAC using MAC_CS out no need to specify ACC sum_0
    IVP_LV2NX8_IP(c0,cptr,64);
    MAC_CS_2N8XR16(c0,IVP_EXTRNX16(d0,3)); // Carry Save
MAC using MAC_CS out no need to specify ACC sum_0
    IVP_LV2NX8_IP(c0,cptr,64);
    MAC_2N8XR16(c0,IVP_EXTRNX16(d0,4)); // Final MAC to
convert CS to 2's complement result.
}
```

Figure 7:
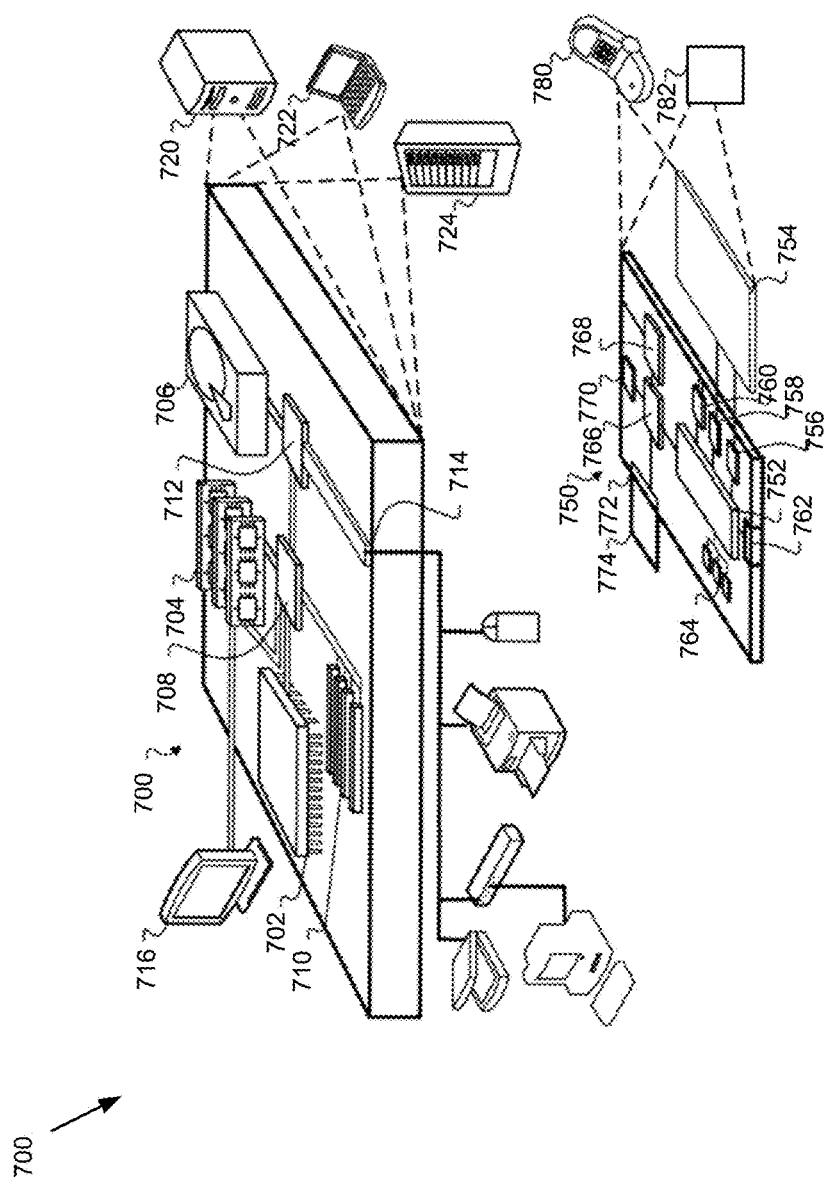
FIG. 7 is a diagram depicting an example of a device that may be used to implement embodiments of the present disclosure.

Referring now to FIG. 7, an example of a computer device 700 and a mobile computer device 750, which may be used with the techniques described herein is provided. Computing device 700 is intended to represent various forms of digital computers, such as tablet computers, laptops, desktops, workstations, personal digital assistants, servers, blade servers, mainframes, and other appropriate computers. In some embodiments, computing device 750 can include various forms of mobile devices, such as personal digital assistants, cellular telephones, smartphones, and other similar computing devices. Computing device 750 and/or computing device 700 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 700 may include processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, may be interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

Memory 704 may store information within the computing device 700. In one implementation, the memory 704 may be a volatile memory unit or units. In another implementation, the memory 704 may be a non-volatile memory unit or units. The memory 704 may also be another form of computer-readable medium, such as a magnetic or optical disk.

Storage device 706 may be capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

High speed controller 708 may manage bandwidth-intensive operations for the computing device 700, while the low speed controller 712 may manage lower bandwidth-intensive operations. Such allocation of functions is exemplary only. In one implementation, the high-speed controller 708 may be coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 may include a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, may be interconnected using various buses, and several of the components may be mounted on a common motherboard or in other manners as appropriate.

Processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

In some embodiments, processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

In some embodiments, memory 764 may store information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

Computing device 750 may be implemented in a number of different forms, as shown in the figure. For example, it may be implemented as a cellular telephone 780. It may also be implemented as part of a smartphone 782, personal digital assistant, remote control, or other similar mobile device.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A digital signal processing system comprising:
at least one C-programmable processor configured to execute an instruction set that includes at least one of multiply instructions and multiply-accumulate instructions that generate a result in carry-save format or redundant binary format, wherein the instruction set is executed at a single instruction, multiple data (SIMD) level, wherein the at least one C-programmable processor further includes a final adder in communication with a carry and sum pipeline, the at least one C-programmable processor further configured to disable the final adder to conserve power.

2. The digital signal processing system of claim 1, wherein the at least one programmable processor further includes at least one register in communication with at least one of a multiplier and a partial product tree.

3. The digital signal processing system of claim 2, wherein the carry and sum pipeline is in communication with at least one of a multiplier and an adder tree.

4. The digital signal processing system of claim 1, wherein the carry and sum pipeline is in communication with at least one of the multiplier and the partial product tree and the carry and sum pipeline is further configured to generate an output that is conditionally provided to at least one of the multiplier and the partial product tree.

5. The digital signal processing system of claim 4, wherein conditionally providing the output from the carry and sum pipeline to at least one of the multiplier and the partial product tree includes bypassing the final adder.

6. The digital signal processing system of claim 5, wherein the multiplier is a booth multiplier.

7. The digital signal processing system of claim 5, wherein bypassing the final adder avoids performing carry propagate addition at an accumulate stage.

8. The digital signal processing system of claim 1, wherein the at least one programmable processor is associated with at least one of a convolutional neural network, an image processing application, a video processing application, an orthogonal frequency-division multiplexing (OFDM) application, a finite impulse response (FIR), a fast-fourier transform (FFT) and an inverse FFT.

9. A digital signal processing method comprising:

providing at least one C-programmable processor;

executing, via the at least one C-programmable processor, an instruction set that includes at least one of multiply instructions and multiply-accumulate instructions that generate a result in carry-save format or redundant binary format, wherein the instruction set is executed at a single instruction, multiple data (SIMD) level, wherein the at least one C-programmable processor further includes a final adder in communication with a carry and sum pipeline, the at least one C-programmable processor further configured to disable the final adder to conserve power.

10. The digital signal processing method of claim 9, wherein the at least one programmable processor further includes at least one register in communication with at least one of a multiplier and a partial product tree.

11. The digital signal processing method of claim 10, wherein the carry and sum pipeline is in communication with at least one of a multiplier and an adder tree.

12. The digital signal processing method of claim 9, wherein the carry and sum pipeline is in communication with at least one of the multiplier and the partial product tree and the carry and sum pipeline is further configured to generate an output that is conditionally provided to at least one of the multiplier and the partial product tree.

13. The digital signal processing method of claim 12, wherein conditionally providing the output from the carry and sum pipeline to at least one of the multiplier and the partial product tree includes bypassing the final adder.

14. The digital signal processing method of claim 13, wherein the multiplier is a booth multiplier.

15. The digital signal processing method of claim 13, wherein bypassing the final adder avoids performing carry propagate addition at an accumulate stage.

16. The digital signal processing method of claim 9, wherein the at least one programmable processor is associated with at least one of a convolutional neural network, an image processing application, a video processing application, an orthogonal frequency-division multiplexing (OFDM) application, a finite impulse response (FIR), a fast-fourier transform (FFT) and an inverse FFT.

* * * * *